(12) United States Patent
York

(10) Patent No.: US 8,973,728 B1
(45) Date of Patent: Mar. 10, 2015

(54) TORQUE LIMITING APPARATUS AND METHOD

(75) Inventor: George T. York, Lake Tapps, WA (US)

(73) Assignee: George T. York, Lake Tapps, WA (US)

( * ) Notice: Subject to any disclaimer, the term of this patent is extended or adjusted under 35 U.S.C. 154(b) by 191 days.

(21) Appl. No.: 13/372,424

(22) Filed: Feb. 13, 2012

(51) Int. Cl.
*F16D 7/04* (2006.01)
*F16D 43/202* (2006.01)

(52) U.S. Cl.
USPC .......................................... 192/56.61; 464/39

(58) Field of Classification Search
USPC .......................... 192/56.56, 56.61; 464/38, 39
See application file for complete search history.

(56) References Cited

U.S. PATENT DOCUMENTS

| | | | | |
|---|---|---|---|---|
| 1,828,370 A | * | 10/1931 | Huddle | 464/39 |
| 2,576,069 A | * | 11/1951 | Hoag et al. | 464/23 |
| 2,733,622 A | * | 2/1956 | Evans | 81/475 |
| 4,062,203 A | * | 12/1977 | Leonard et al. | 464/38 |
| 2007/0267266 A1 | * | 11/2007 | Lee-Liao | 192/56.61 |
| 2008/0015034 A1 | * | 1/2008 | Downey | 464/39 |

\* cited by examiner

*Primary Examiner* — Richard Lorence
(74) *Attorney, Agent, or Firm* — Wells St. John P.S.

(57) ABSTRACT

A torque limiting apparatus is provided having an input shaft, an output shaft, a housing, a spring, and a length adjustable shank and collar assembly. The input shaft communicates with a rotating end segment having a cam surface. The output shaft communicates with a rotating end segment having a complementary cam surface for engaging with the cam surface of the input shaft. The cam surfaces cooperate to generate separation forces between the respective rotating end segments. The spring is configured to oppose the separation forces generated by the cam surfaces, and is configured to urge together the first end segment and the second end segment to remain in rotating coupled engagement. The length adjustable shank and collar assembly is provided between the spring and the housing and is configured to adjust compressive force on the spring to change torque output of the apparatus. A method is also provided.

8 Claims, 14 Drawing Sheets

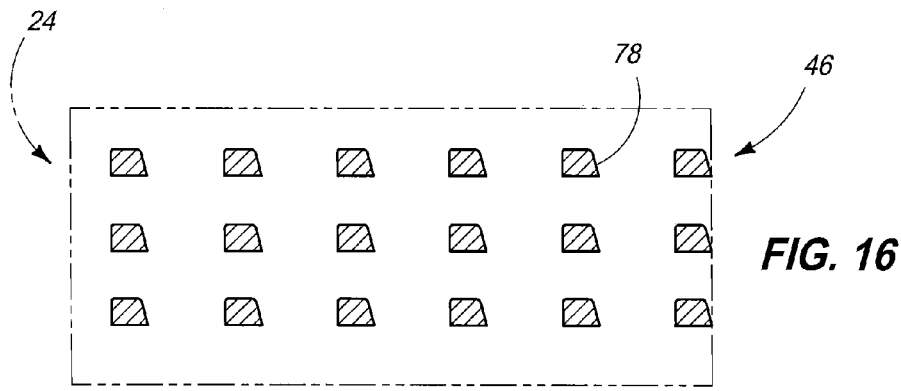
FIG. 16
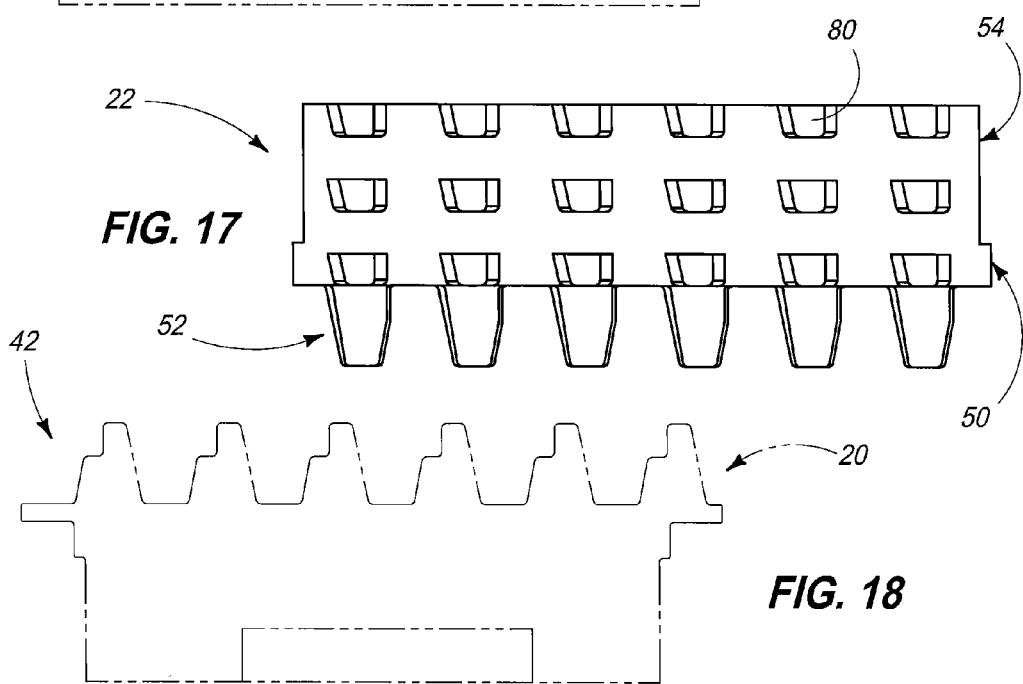
FIG. 17
FIG. 18
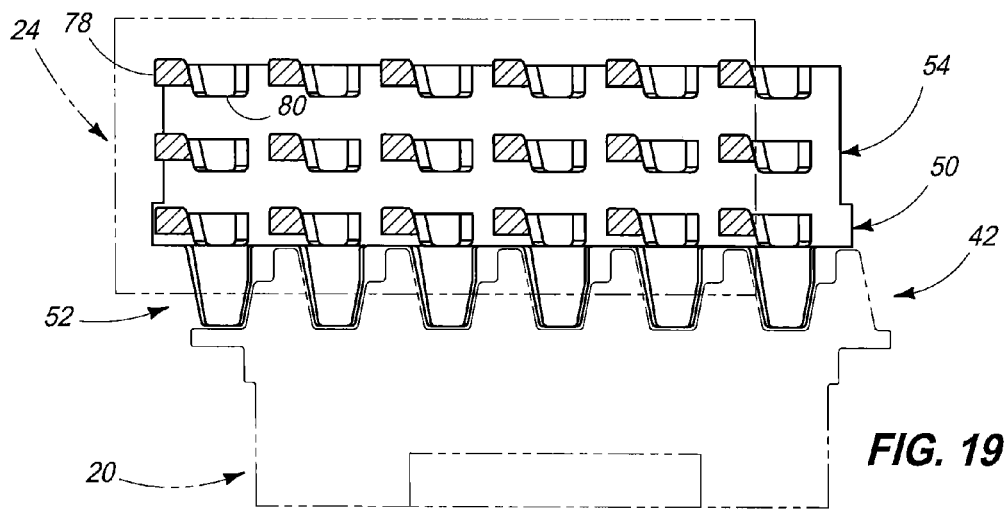
FIG. 19

TORQUE LIMITING APPARATUS AND METHOD

CROSS REFERENCE TO RELATED APPLICATION

This application claims priority to U.S. Provisional Patent Application No. 61/442,225 filed Feb. 12, 2011, entitled "Torque Tool", the entirety of which is incorporated by reference herein.

TECHNICAL FIELD

The presently disclosed subject matter pertains to apparatus and methods for limiting loads from a motor to an output shaft. More particularly, the presently disclosed subject matter relates to apparatus and methods for coupling a drive source to an output shaft with a clutch and torque limiting tool.

BACKGROUND OF THE INVENTION

Techniques are known for limiting torque delivery to an output shaft, such as when tightening lug nuts on threaded studs during a wheel mounting operation. Improvements are needed in how torque is accurately set and limited when securing together threaded fasteners when bolting together structures using threaded fasteners.

SUMMARY OF THE INVENTION

A torque limiting apparatus and method are provided with a torque adjustment mechanism that compresses a disengagement spring.

According to one aspect, a torque limiting apparatus is provided having an input shaft, an output shaft, a housing, a spring, and a length adjustable shank and collar assembly. The input shaft communicates with a rotating end segment having a cam surface. The output shaft communicates with a rotating end segment having a complementary cam surface for engaging with the cam surface of the input shaft. The cam surfaces cooperate to generate separation forces between the respective rotating end segments. The housing encases the first end segment and the second end segment. The spring is supported in the housing, and is configured to oppose the separation forces generated by the cam surfaces, and is configured to urge together the first end segment and the second end segment to remain in rotating coupled engagement. The length adjustable shank and collar assembly is provided between the spring and the housing and is configured to adjust compressive force on the spring to change torque output of the apparatus According to another aspect, a torque limiting apparatus is provided having an input shaft, a circumferential array of cam surfaces, a cylindrical collar, a spline shaft, a housing, and a spring. The input shaft communicates with a cylindrical end segment having a circumferential array of cam surfaces. The cylindrical collar has a complementary cylindrical end segment with a complementary circumferential array of co-acting cam surfaces. The cylindrical collar includes a circumferential array of radially inwardly extending drive lugs and a clearance raceway disposed axially from the lugs. The cylinder includes a circumferential array of radially inwardly extending lugs and a clearance raceway disposed axially from the lugs. The spline shaft has a radially outwardly extending array of driven lugs. The housing encases the first end segment and the second end segment. The spring urges together the first end segment and the second end segment.

BRIEF DESCRIPTION OF THE DRAWINGS

Preferred embodiments of the disclosure are described below with reference to the following accompanying drawings.

FIG. 16 is simplified representative view taken in a radial outward direction as shown in FIG. 15 and depicted unwound in a planar view showing the array of radially outwardly extending driven lugs on the spline output shaft of FIG. 1.

FIG. 17 is a simplified representative view taken in a radial outward direction as shown in FIG. 15 and depicted unwound in a planar view showing the array of radially inwardly extending driven lugs and drive collar.

FIG. 18 is a simplified representative view taken in a radial outward direction as shown in FIG. 15 and depicted unwound in a planar view showing the input/drive cam body.

FIG. 19 is a simplified representative view taken in a radial outward direction as shown in FIG. 15 and showing the array of driven lugs on the spline output shaft, the driven cam body, and the drive cam body overlaid in an engaged drive position as held together by the coil spring within the housing assembly while applying torque to a nut at the output end.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Figure 1:
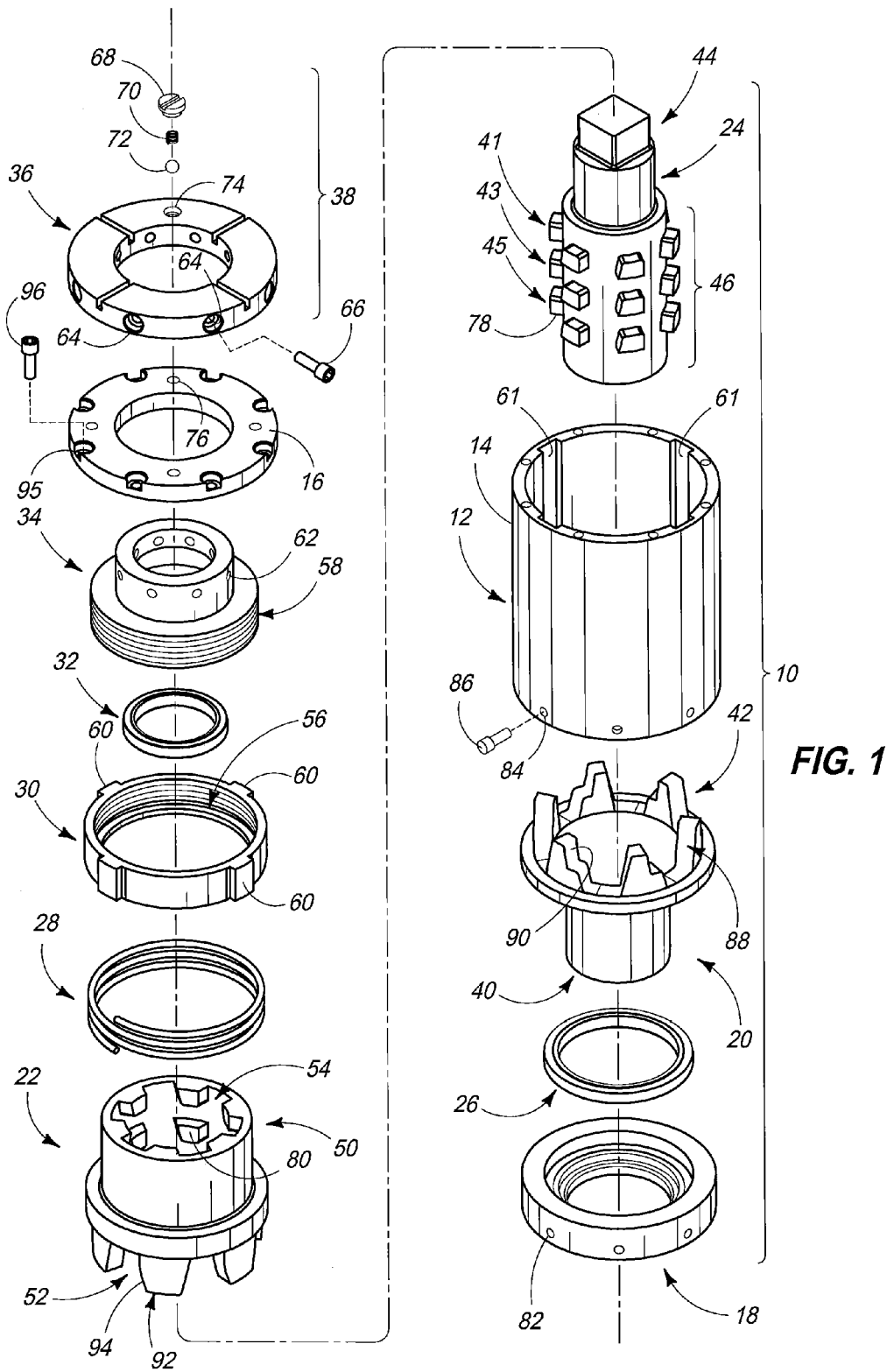
FIG. 1 is an exploded schematic perspective view from an output end of a torque limiting apparatus having features in accordance with one embodiment.

FIG. 1 illustrates a torque limiting apparatus, or device 10 according to one embodiment. Device 10 includes a housing assembly, or frame 12 that includes a cylindrical body 14, an output end plate 16, an input end plate 18, a drive cam body 20, a driven cam body 22, a spline output shaft 24, a coil spring 28, a spring compression adjustment assembly having a threaded adjuster collar 30 and a complementary threaded adjuster shank 34, and an adjustment catch assembly 38.

As shown in FIG. 1, adjuster shank 34 is threaded relative to adjuster collar 30 in order to increase or decrease the compression of coil spring 28 which decreases or increases respectively the force used to push together a circumferential array 42 of cam surfaces 90 on a circumferential array of drive fingers 88 against a complementary circumferential array 52 of cam surfaces 94 on a circumferential array of driven fingers 92.

When a preset torque value is exceeded, spring 28 is compressed, and cam surfaces 90 and 94 move apart such that individual lugs 78 within an array 46 radially outwardly extending driven lugs 78 move into cylindrical clearance raceways within an array 54 of radially inwardly extending drive lugs 80 of cam drive body. Hence, cam drive body 20 separates from cam driven body 22, as shown by the position represented in FIG. 21. When operating under the preset torque, spring 28 retains cam drive body 20 and cam driven body 22 together such that lugs 80 and 78 are engaged together to drive a spline output shaft 24 in rotation. In one case, a socket for a lug nut is mounted onto a driven output post 44 of spline output shaft 24.

An array of male threads 58 on adjuster shank 34 of FIG. 1 mate in threaded engagement with complementary female threads 56 on adjuster collar 30, enabling lengthening and shortening of the resulting assembly, thereby causing compression and relief to spring 28 in the assembly. Adjuster shank 34 is rotated to specific angular positions relative to collar 30 as adjustment catch assembly 38 provides a definitive rotary catch at each 90 degree angle of shank 34 relative to collar 30. More particularly, adjuster plate 36 is secured with a plurality of threaded fasteners, or machine screws 66 that pass through individual respective bores 64 and into threaded apertures 62 in shank 34, thereby securing plate 36 onto shank 34. During rotation of shank 34 in collar 30, collar 30 is prevented from rotating by a circumferential array of ribs, or tenons 60 that move axially within respective axial slots 61 within an inner wall surface of cylindrical body 14.

Adjustment catch assembly 38 comprises a threaded fastener, or screw 68, a coil spring 70, a hardened steel ball bearing 74, and a threaded bore, or aperture 74 in plate 36 that cooperate with a respective one of several semi-spherical recesses 76 provided in a circumferential array atop end plate 16. Plate 36 and shank 24 can be rotated relative to plate 16, as spring 70 compresses until ball bearing 72 is received into a next adjacent recess 76 where the rotary position is then held in place by ball bearing 72 seating within the respective recess 76.

Figure 10:
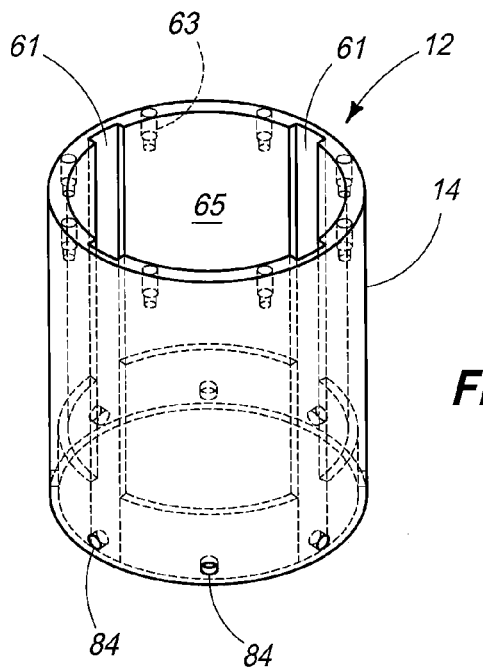
FIG. 10 is a perspective view of a housing member of FIG. 1.

In assembly, end plate 18 is secured within a bottom of cylindrical body 14 with a plurality of circumferentially spaced-apart threaded fasteners, or machine screws 86, that pass through apertures 84 and into complementary threaded apertures 82 in end plate 18, as shown in FIG. 1. A sealed cylindrical bearing 26 is received within end plate 18 where it is press fit. A cylindrical drive input post 40 on cam drive body 20 is seated for rotation within bearing 26. Similarly, a sealed cylindrical bearing 32 is press fit within a recess 67 (see FIG. 4D) where a cylindrical portion of driven output post 44 is received for rotation. A circumferential array of threaded fasteners, or machine screws 96 pass through respective apertures 95 in adjuster plate 36 and into respective threaded bores 63 (see FIG. 10) in cylindrical body 14 to secure plate 36 to body 14. When assembled together, plates 36 and 18 and housing 12 cooperate with collar 30 to compress coil spring 28. When a desired torque is exceeded between input post 40 and output post 44, cam surfaces 90 and 94 drive apart cam drive body 20 and cam driven body 22, causing spring 28 to further compress.

Figure 9:
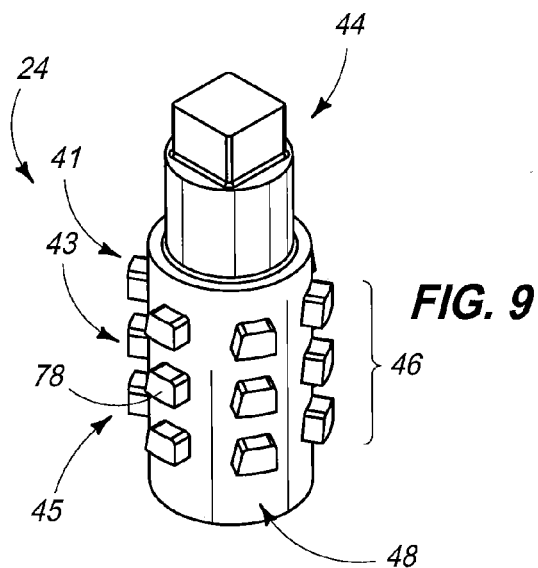
FIG. 9 is a perspective view of a spline output shaft of FIG. 1.
Figure 9A:
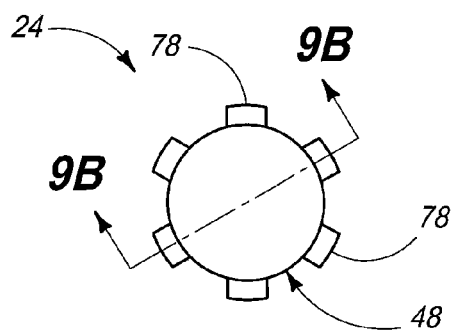
FIG. 9A is a view from below of the spline output shaft of FIG. 9.
Figure 9B:
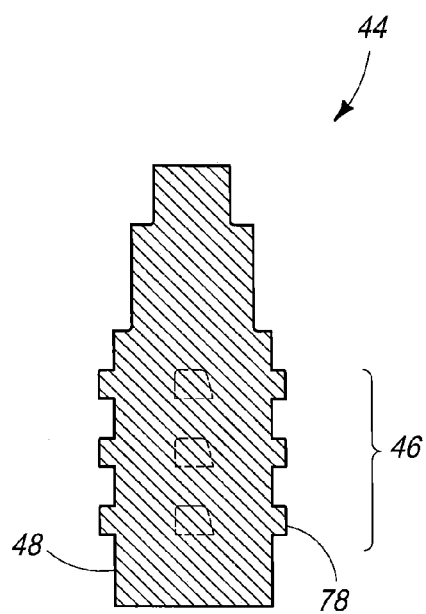
FIG. 9B is a centerline sectional view taken along line 9B-9B of FIG. 9A.
Figure 9C:
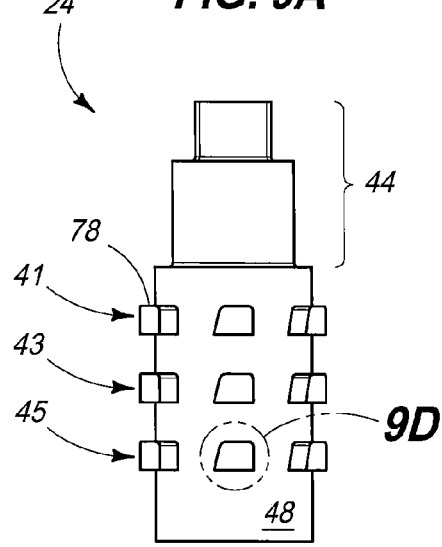
FIG. 9C is a side view of the spline output shaft of FIG. 9.
Figure 9D:
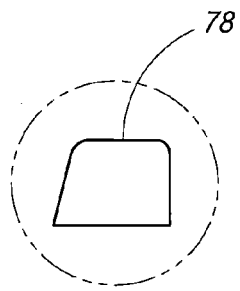
FIG. 9D is a side view of a lug taken from within the encircled region 9D of FIG. 9C.

As shown in FIG. 1, array 46 comprises three unique circumferential rows 41, 43 and 45 of radially outwardly extending lugs 78 from surface 48 (see FIG. 9). Array 46 of lugs 78 mate in engagement with a complementary array 54 of radially inwardly extending lugs 80 on cylindrical drive collar 50 of cam drive body 22. As angular surfaces of coacting cam surfaces 90 and 94 engage with increasing torque, axial force is generated against spring 28, eventually compressing spring 28 and driving apart cam drive body 20 and cam driven body 22 until they lock apart in the configuration shown in FIG. 21 where individual shelves 93 hold apart bodies 20 and 22 via fingers 92 being seated atop respective shelves 93.

Figure 2:
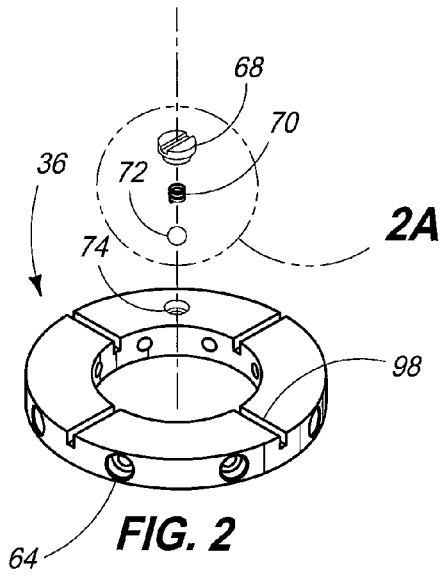
FIG. 2 is an exploded schematic perspective view of an adjuster plate of FIG. 1.
Figure 2A:
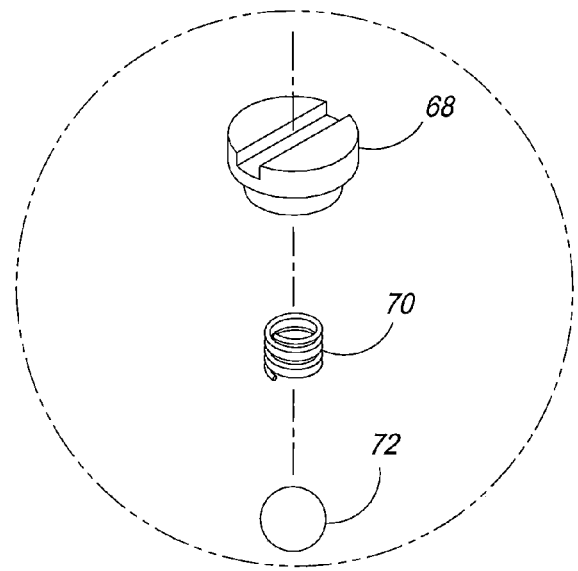
FIG. 2A is a further enlarged exploded perspective view from the encircled region 2A of FIG. 2.
Figure 2B:
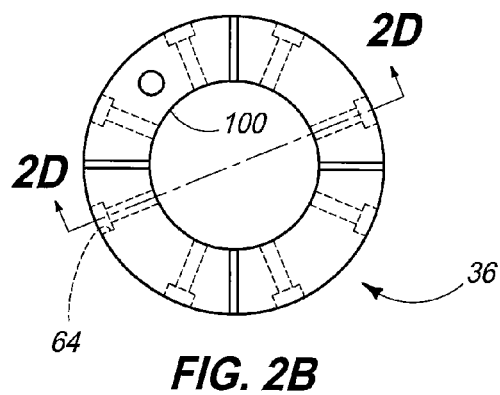
FIG. 2B is a plan view of the adjuster plate of FIG. 2.
Figure 2C:
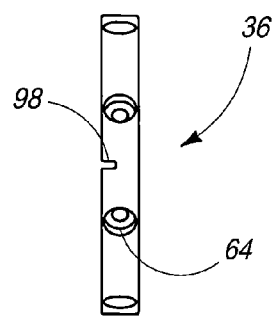
FIG. 2C side view of the adjuster plate of FIGS. 2 and 2B.
Figure 2D:
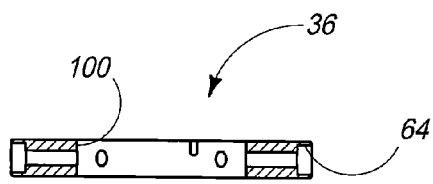
FIG. 2D is a centerline sectional view taken along line 2D-2D of FIG. 2B.

FIG. 2 illustrates construction of the adjustment catch assembly including threaded screw 68, coil spring 70, ball bearing 72 and threaded aperture 74 of plate 36. FIG. 2A further illustrates threaded screw 68, spring 70 and ball bearing 72. An inner cylindrical surface 100 on plate 36 is shown in FIGS. 2B and 2D which is received over a complementary cylindrical outer surface 63 on shank 34 (see FIG. 4). Each through bore 34 in plate 36 of FIGS. 2B-2D receives a respective threaded fastener 66 (see FIG. 1) for securing plate 36 onto shank 34 (see FIG. 4). Radial slots 98 are provided in plate 36. Slots 98 provide a visual indicator of rotated position of shank 34 correlated with spring pressure and torque setting. Optionally, a visual scale can be provided on an outer surface of end plate 16 to indicate relative position between shank 34 and plate 16.

Figure 3:
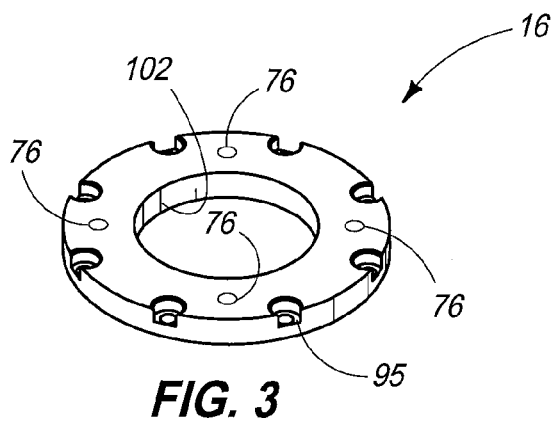
FIG. 3 is a perspective view of an end plate of FIG. 1.
Figure 3A:
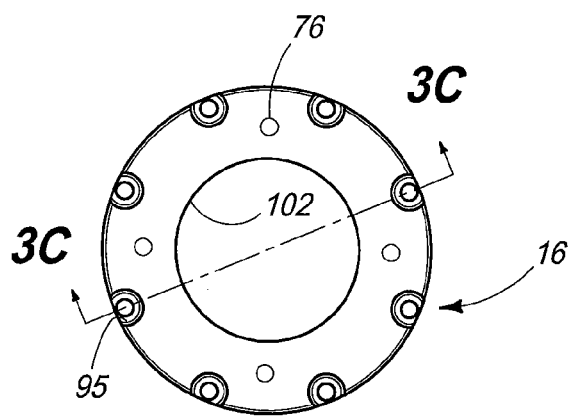
FIG. 3A is a plan view of the end plate of FIG. 3.
Figure 3B:
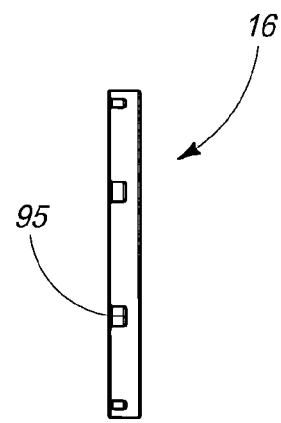
FIG. 3B is a side view of the end plate of FIGS. 3 and 3A.
Figure 3C:
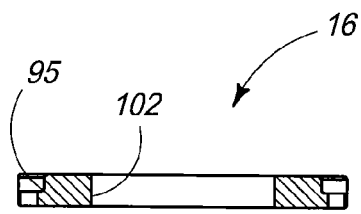
FIG. 3C is a centerline sectional view taken along line 3C-3C of FIG. 3A.

FIGS. 3 and 3A-3C illustrate the construction of end plate 16. An inner circumferential surface 102 on plate 16 of FIG. 3 is received for rotation about cylindrical outer surface 63 on shank 34 (see FIG. 4). A circumferential array of recessed through bores 95 provide for passage of fasteners 96 (see FIG. 1) in assembly.

Figure 4:
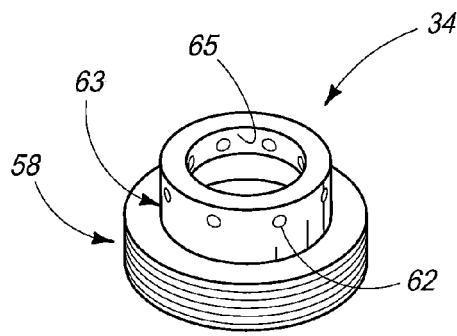
FIG. 4 is a perspective view of an adjuster plate of FIG. 1.
Figure 4B:
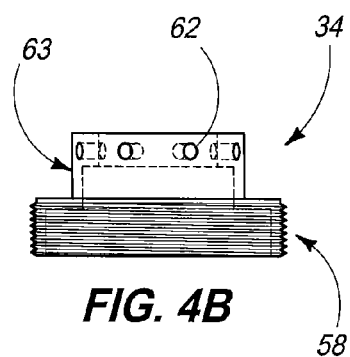
FIG. 4B is a side view of the adjuster plate of FIGS. 4A and 4B.
Figure 4A:
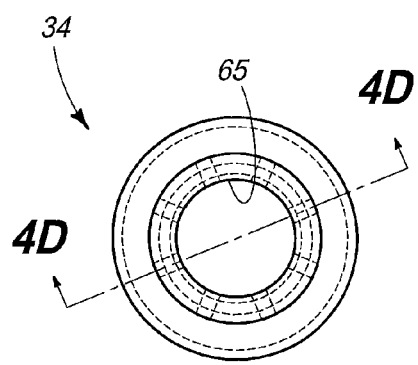
FIG. 4A is a plan view of the adjuster plate of FIG. 4.
Figure 4C:
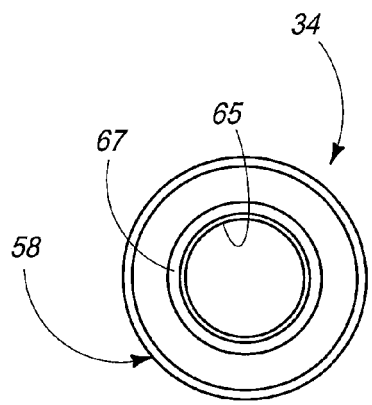
FIG. 4C is a bottom view of the adjuster plate of FIGS. 4, 4A and 4B.
Figure 4D:
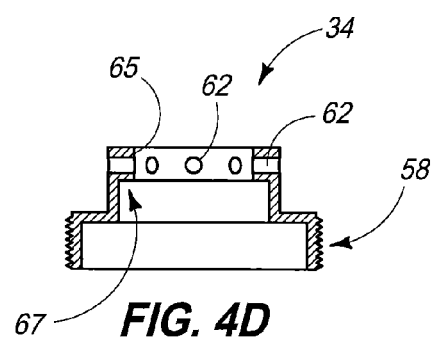
FIG. 4D is a centerline sectional view taken along line 4D-4D of FIG. 4A.
Figure 5:
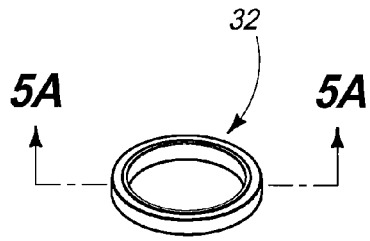
FIG. 5 is a perspective view of a sealed bearing assembly of FIG. 1.
Figure 5A:
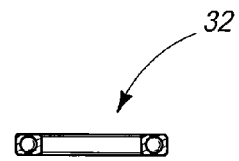
FIG. 5A a centerline sectional view taken along line 5A-5A of FIG. 5.
Figure 6:
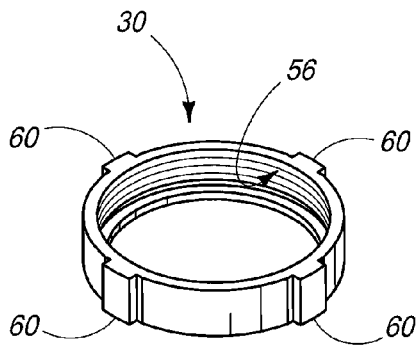
FIG. 6 a perspective view of a threaded adjuster collar.
Figure 6A:
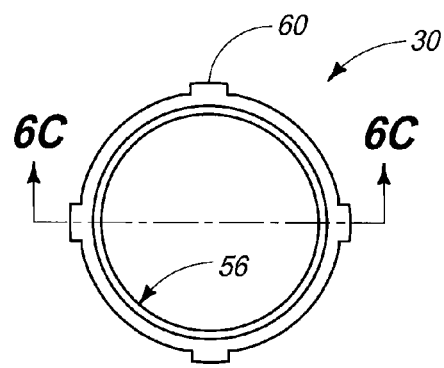
FIG. 6A is a plan view of the threaded adjuster collar of FIG. 6.
Figure 6B:
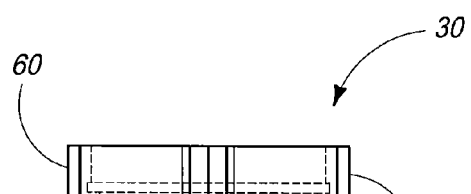
FIG. 6B is a side view of the threaded adjuster collar of FIGS. 6 and 6A.
Figure 6C:
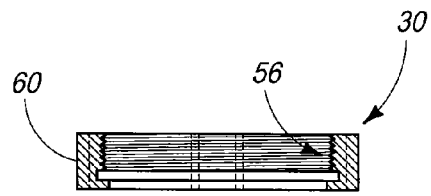
FIG. 6C is a centerline sectional view taken along ling 6C-6C of FIG. 6A.

FIGS. 4 and 4A-4D depict construction of adjuster shank 34. More particularly, shank 34 includes cylindrical outer surface 63 and cylindrical inner surface 65, as shown in FIG. 4. A circumferential array of through bores, or apertures 62 are provided for receiving threaded fasteners 66 (see FIG. 1) in assembly. A circumferential recess, or bearing seat 67 shown in FIGS. 4C and 4D is configured to receive bearing assembly 32 (see FIG. 1) in assembly. FIGS. 5 and 5A illustrate sealed bearing assembly 32 in greater detail.

FIGS. 6 and 6A-6C illustrate features of threaded adjuster collar 30. A radial array of outwardly extending ribs, or tenons 60 and female threads 56 are formed in collar 30, as shown in FIGS. 6 and 6A-6C.

Figure 7:
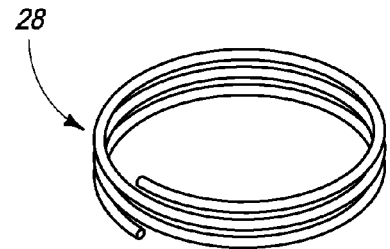
FIG. 7 is a perspective view of a coil spring of FIG. 1.

FIG. 7 shows coil spring 28 which is formed from spring steel. Optionally, other types of springs can be used. Coil spring 28 has open coil windings that allow for compression of spring 28.

Figure 8:
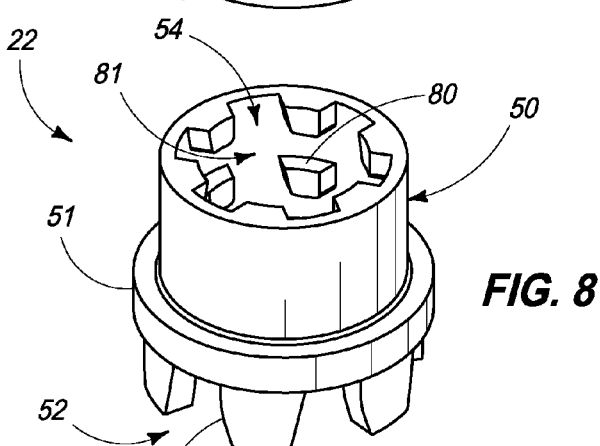
FIG. 8 is a perspective view of a cam body of FIG. 1.
Figure 8A:
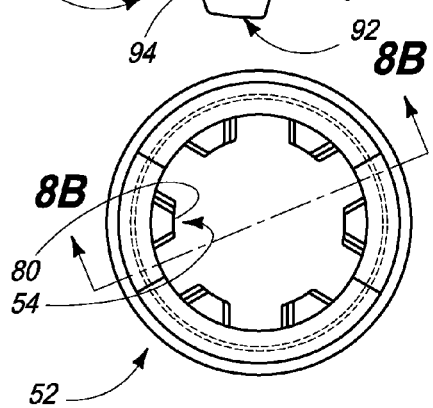
FIG. 8A is a plan view of the cam body of FIG. 8.
Figure 8B:
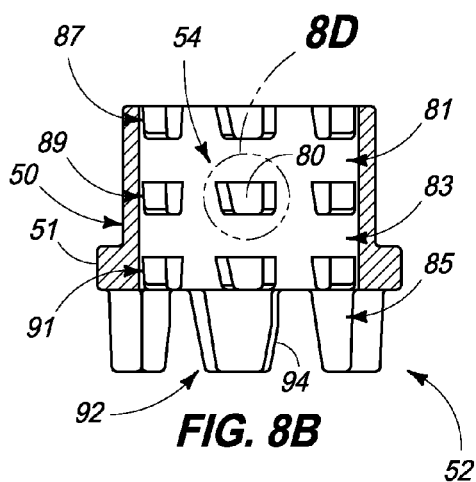
FIG. 8B is a centerline sectional view taken along line 8B-8B of FIG. 8A.
Figure 8C:
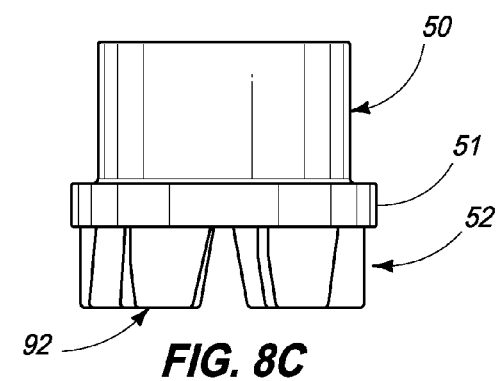
FIG. 8C is a side view of the cam body of FIG. 8.
Figure 8D:
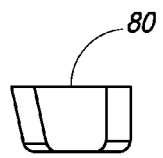
FIG. 8D is a side view of a lug taken from within the encircled region 8D of FIG. 8B.

FIGS. 8 and 8A-8D show construction of cam drive body 22 including cylindrical drive collar 50, cylindrical shoulder 51, and circumferential array 52 of fingers 92, each with a cam surface 94. As shown in FIG. 8, array 54 includes radially inwardly extending lugs, or drive arms 80 provided in three unique circumferential rows 87, 89 and 91, with clearance raceways 81, 83 and 85 provided adjacent each row 87, 89 and 91, respectively, as shown in FIG. 8B.

FIGS. 9 and 9A-9D illustrate construction of spline output shaft 24. More particularly, shaft 24 includes array 46 of lugs, or driven arms 78 provided in three distinct circumferential rows 41, 43 and 45 and extending from circumferential outer surface 48, as shown in FIG. 9. Each lug 78 has a sloped engagement surface that mates with a complementary sloped engagement surface on each respective lug 80 (of FIG. 8).

Figure 10B:
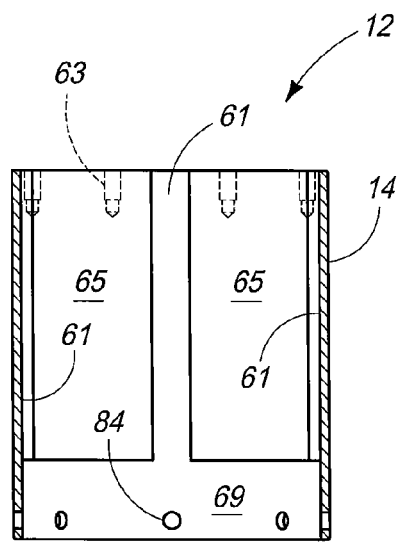
FIG. 10B is a centerline sectional view taken along line 10B-10B of FIG. 10A.
Figure 10A:
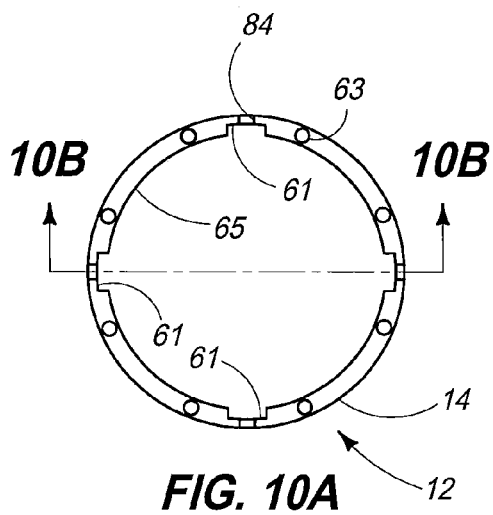
FIG. 10A is a plan view of the housing member of FIG. 10.
Figure 10C:
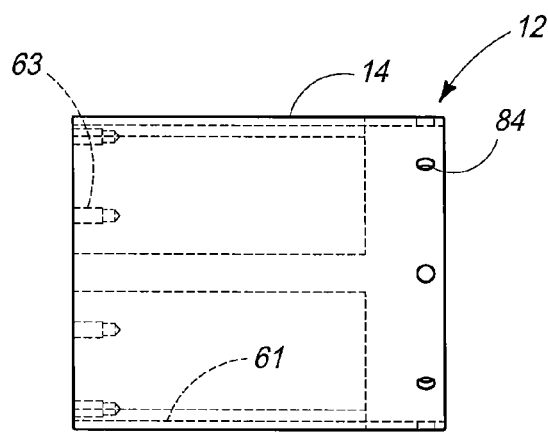
FIG. 10C is a side view of the housing member of FIG. 10.

FIGS. 10 and 10A-10C show construction of housing assembly 12, namely cylindrical body 14. Four axially extending slots 61 are formed in an inner cylindrical surface 65 of body 14 for receiving ribs 60 (see FIG. 1). Each rib 61 communicates with an expanded inner cylindrical surface 69 within body 14, as shown in FIG. 10B.

Figure 11:
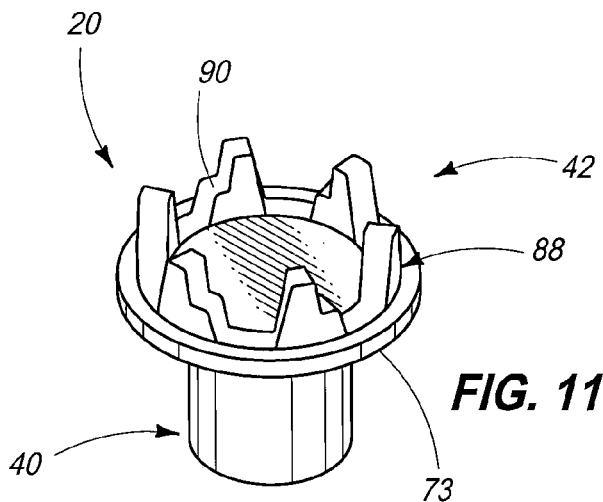
FIG. 11 is a perspective view of a cam body of FIG. 1.
Figure 11A:
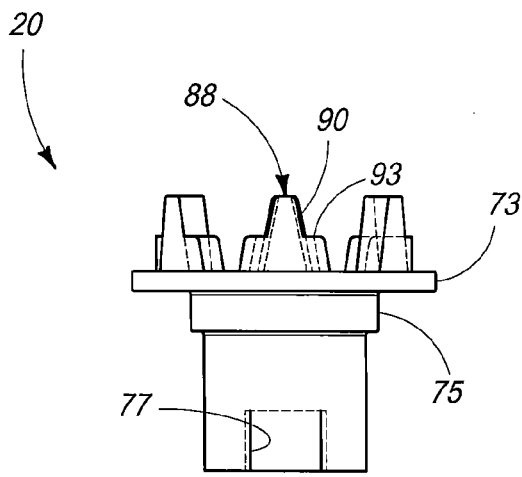
FIG. 11A is a side view of the cam body of FIG. 11.
Figure 11C:
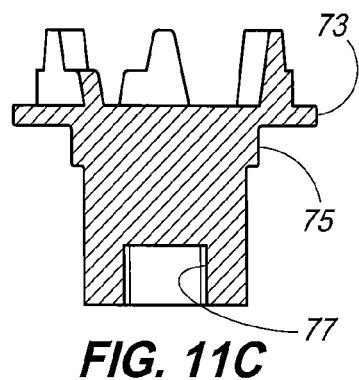
FIG. 11C is a centerline sectional view taken along line 11C-11C of FIG. 11B.
Figure 11B:
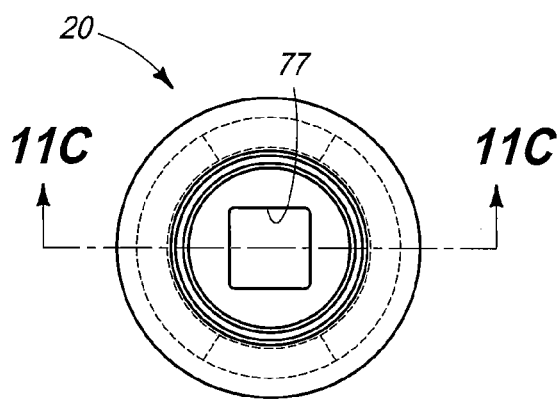
FIG. 11B is a bottom view of the cam body of FIGS. 11 and 11A.

FIGS. 11 and 11A-C shown construction of cam drive body 20, including a circumferential array 42 of fingers 88 provided on an end segment 73 atop a shoulder 75, each having a cam surface 90 with a compound curved and flat shape. Each finger 88 has a horizontal flat surface 93 on cam surface 90 for seating cooperating fingers 92 on cam drive body 22 when spring 28 is compressed under excessive torque, which disengages bodies 20 and 22 (see FIG. 21), thereby placing lugs 78 in clearance raceways 81, 83 and 85 (see FIG. 8B). As shown in FIGS. 11A-11C, a square socket recess 77 is provided in post 40 (see FIG. 11) for receiving the drive head of a pneumatic wrench (or other drive tool).

Figure 12:
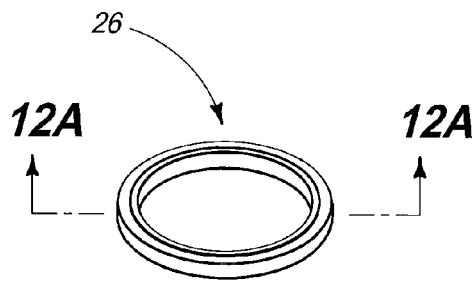
FIG. 12 is a perspective view of a sealed bearing assembly of FIG. 1.
Figure 12A:
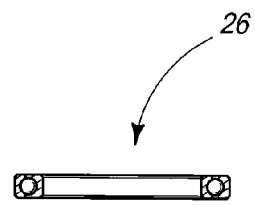
FIG. 12A is a centerline sectional view of the bearing assembly taken along line 12A-12A of FIG. 12.

FIGS. 12 and 12A further illustrate construction of sealed cylindrical bearing assembly 26.

Figure 13:
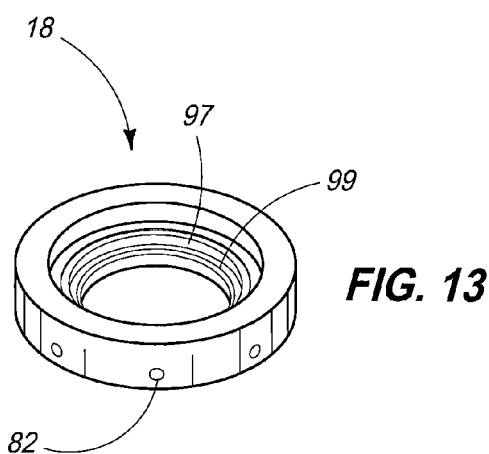
FIG. 13 is a perspective view of an end plate of FIG. 1.
Figure 13A:
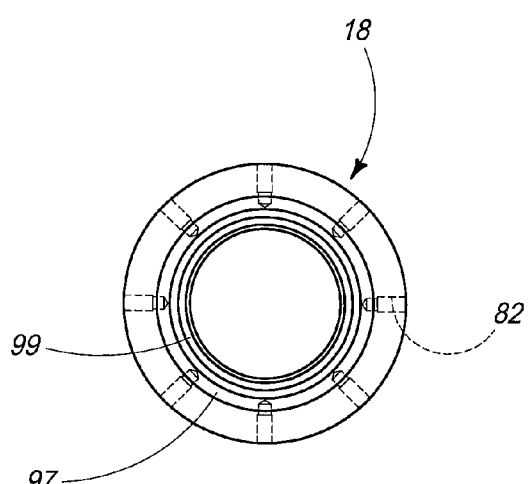
FIG. 13A is a plan view of the end plate of FIG. 13.
Figure 13B:
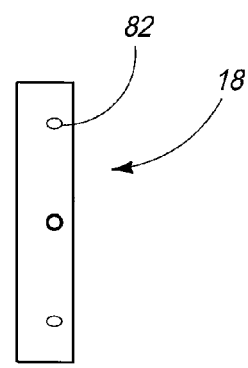
FIG. 13B is a side view of the end plate of FIGS. 13 and 13A.

FIG. 13 shows end plate 18 and further depicts a cylindrical bearing recess 97 and a cylindrical seal recess 99. Bearing 26 is received within recess 97 in assembly.

Figure 14:
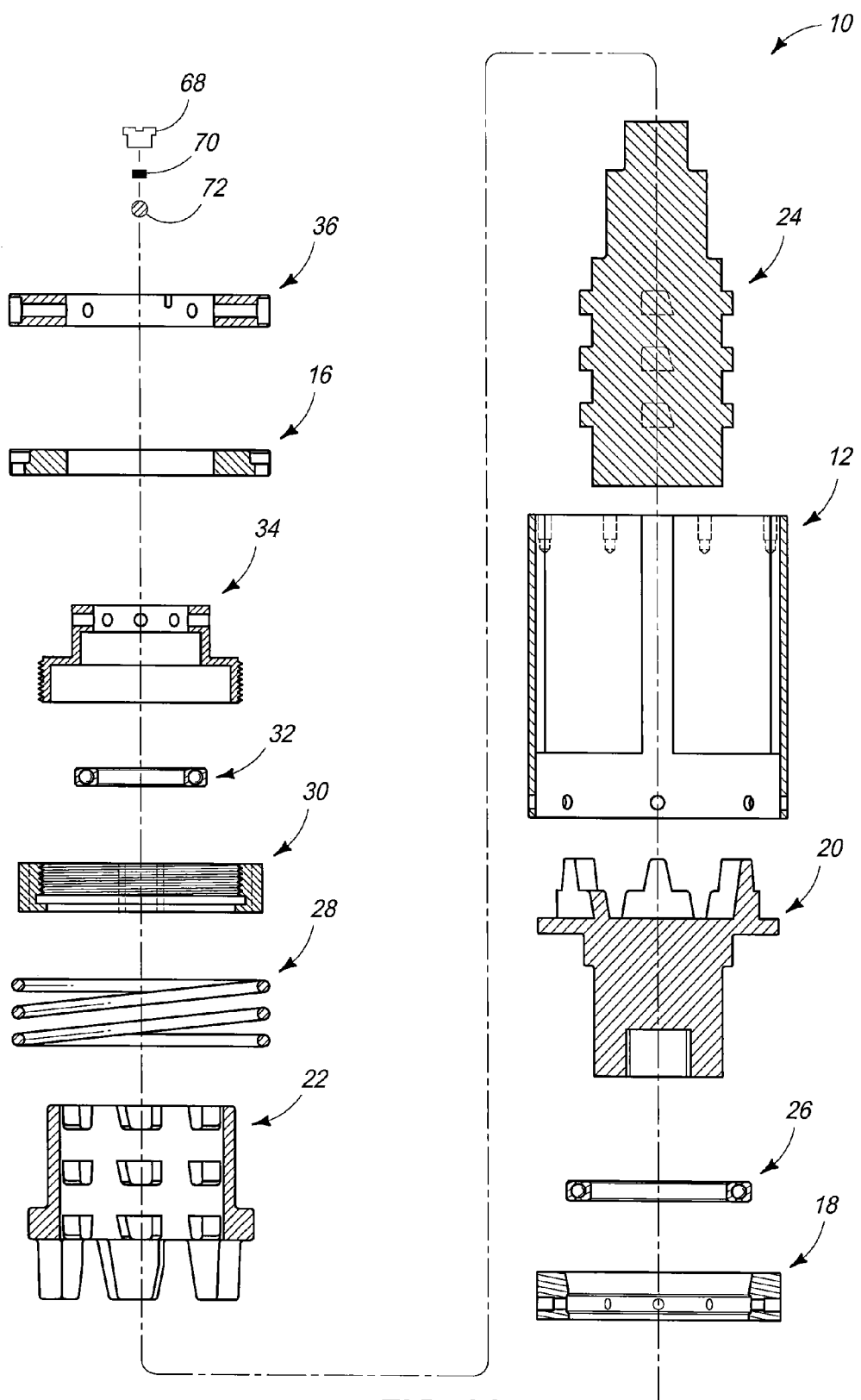
FIG. 14 is an exploded centerline sectional view of the torque limiting apparatus of FIG. 1.

FIG. 14 illustrates in exploded centerline sectional view torque limiting apparatus 10. Insertion of spline output shaft 24 within housing 12 and between cam drive body 20 and cam driven body 22 are clearly illustrated.

Figure 15:
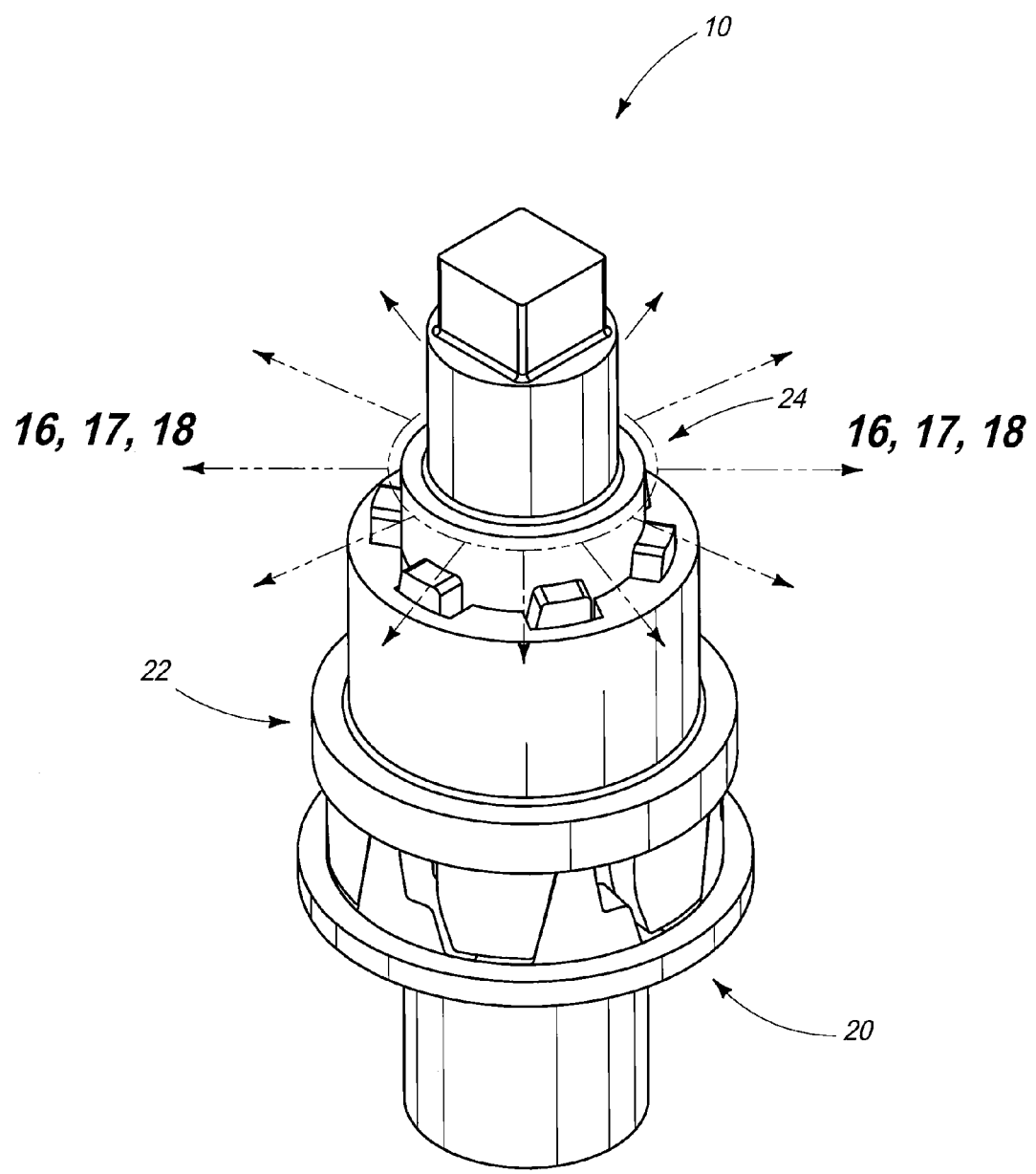
FIG. 15 is a perspective view of the torque limiting apparatus of FIGS. 1 and 14, assembled together and with the housing assembly, spring adjustment catch assembly, and adjuster collar and shank removed.

FIG. 15 illustrates a perspective view of the torque limiting apparatus of FIGS. 1 and 14, assembled together and with the housing assembly, spring adjustment catch assembly, and adjuster collar and shank removed. Cam drive body 20 and cam driven body 22 are shown in engaged positions for imparting torque from the input post to the output post via the spline output shaft.

FIG. 16 is a simplified representative view taken in a radial outward direction as shown in FIG. 15 and depicted unwound in a planar view showing the array 46 of radially outwardly extending driven lugs 78 on the spline output shaft 24 of FIG. 1.

FIG. 17 is a simplified representative view taken in a radial outward direction as shown in FIG. 15 and depicted unwound in a planar view showing the array 54 of radially inwardly extending driven lugs 80 and cam drive collar 22.

FIG. 18 is a simplified representative view taken in a radial outward direction as shown in FIG. 15 and depicted unwound in a planar view showing the input/drive cam body 20.

FIG. 19 is a simplified representative view taken in a radial outward direction as shown in FIG. 15 and showing the array 46 of driven lugs 78 on the spline output shaft 24, the cam driven body 22, and the drive cam body 20 overlaid in an engaged drive position as held together by the coil spring (not shown) within the housing assembly (not shown) while applying torque to a nut at the output end of spline shaft 24.

Figure 20:
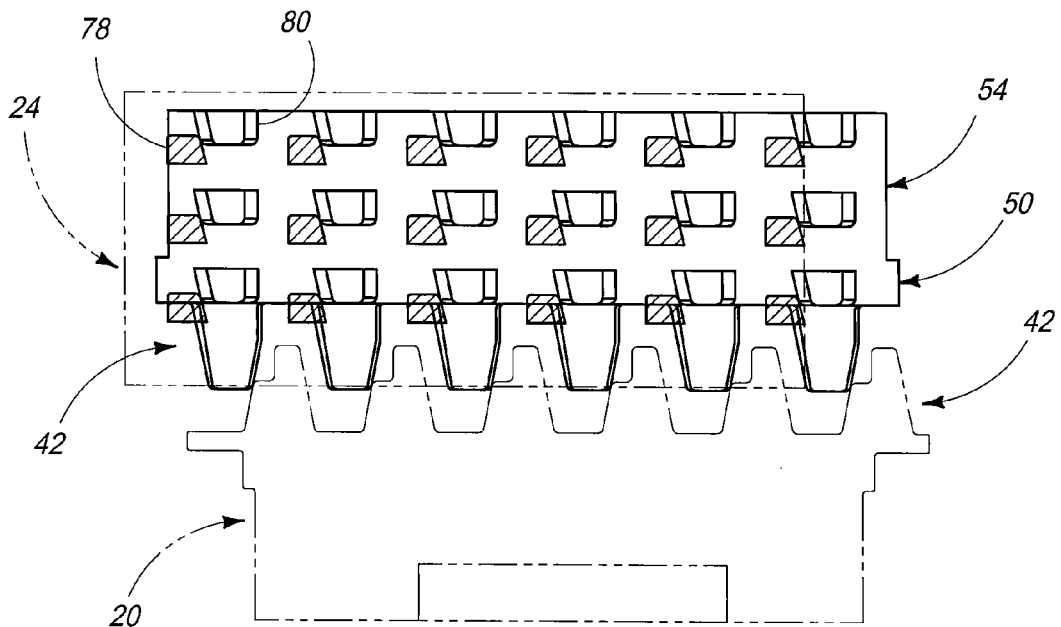
FIG. 20 is a simplified representative view taken in a radial outward direction as shown in FIG. 15 and showing the array of driven lugs on the spline output shaft, the driven cam body, and the drive cam body overlaid in an engaged drive position as held together by the coil spring within the housing assembly, but while the spring begins to engage (between the positions shown in FIGS. 19 and 21) while applying torque to a nut at the output end.

FIG. 20 is a simplified representative view taken in a radial outward direction as shown in FIG. 15 and showing the array 46 of driven lugs 78 on the spline output shaft 24, the driven cam body 22, and the drive cam body 20 overlaid in an engaged drive position as held together by the coil spring (not shown) within the housing assembly (not shown), but while the spring begins to engage (between the positions shown in FIGS. 19 and 21) while applying torque to a nut at the output end of spline shaft 24.

Figure 21:
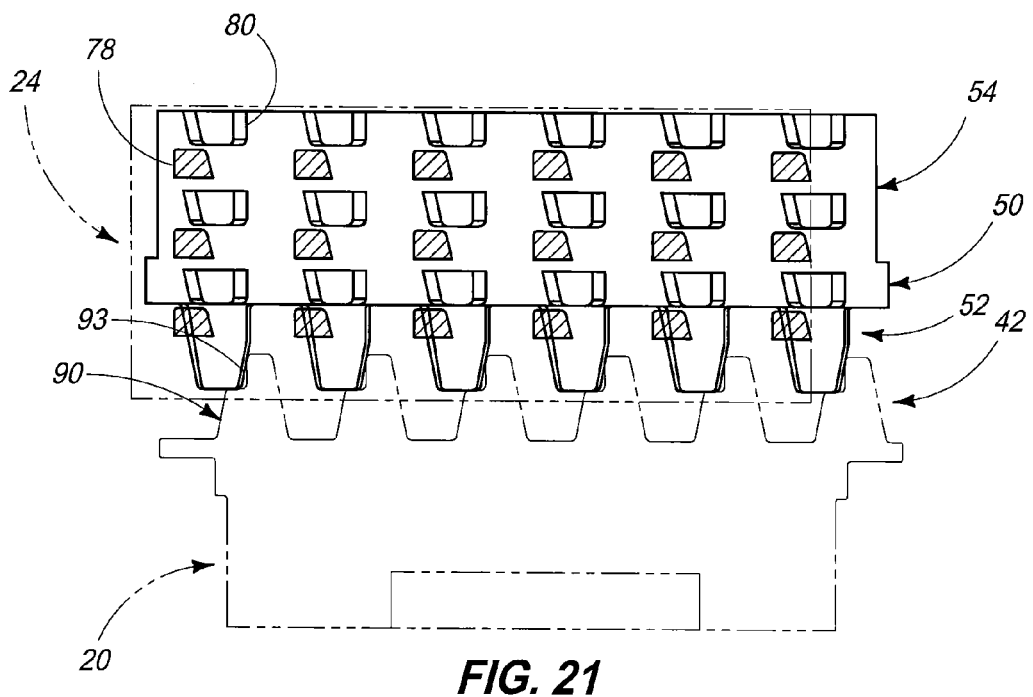
FIG. 21 is a simplified representative view taken in a radial outward direction as shown in FIG. 15 and showing the array of driven lugs on the spline output shaft, the driven cam body, and the drive cam body overlaid in a disengaged drive position as the coil spring is compresses within the housing assembly when a set torque limit has been exceeded.

FIG. 21 is a simplified representative view taken in a radial outward direction as shown in FIG. 15 and showing the array 46 of driven lugs 78 on the spline output shaft 24, the driven cam body 22, and the drive cam body 20 overlaid in a disengaged drive position as the coil spring (not shown) is compressed within the housing assembly (not shown) when a set torque limit has been exceeded at the end of spline output shaft 24.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A torque limiting apparatus, comprising:
   an input shaft communicating with a first rotating end segment having a cam surface;
   an output shaft assembly having an output shaft and a second end segment, the second end segment having a complementary cam surface for engaging with the cam surface of the first end segment, the cam surfaces cooperating to generate separation forces between the respective first and second end segments when a threshold decoupling torque level between the input shaft and the output shaft is realized;
   a housing encasing the first end segment and the second end segment; and
   a spring supported in the housing, configured to oppose the separation forces generated by the cam surfaces, and configured to urge together the first end segment and the second end segment to remain in rotating coupled engagement while transferring torque from the input shaft to the output shaft; and
   a length adjustable shank and collar assembly having a collar fixed for non-rotation and free for axial translation relative to the housing and an adjuster shank provided in threaded engagement with the collar to impart length adjustment between the collar and the adjuster shank, the length adjustable shank and collar assembly provided between the spring and the housing and having a plurality of predetermined set adjustment positions corresponding with physical locations that realize specific unique axial lengths that correspond with compression of the spring and realize corresponding unique torque levels and configured to adjust compressive force on the spring to change the threshold decoupling torque level of the apparatus.

2. The torque limiting apparatus of claim 1, wherein the length adjustable shank and collar assembly comprises an adjuster plate affixed to the adjuster shank distal of the collar.

3. The torque limiting apparatus of claim 2, wherein the length adjustable shank and collar assembly further comprises an output end plate of the housing interposed between the adjuster plate and the adjuster shank.

4. The torque limiting apparatus of claim 3, wherein the output end plate further comprises a circumferential array of semi-spherical recesses provided atop the output end plate facing the adjuster plate and a ball bearing is provided in sprung relation on the adjuster plate for seating uniquely in each of the respective recesses corresponding each with a specific axial length of the collar and the adjuster shank corresponding with a unique compression of the spring.

5. The torque limiting apparatus of claim 4, wherein a threaded bore is provided in the adjuster plate, and the ball bearing is inserted into the bore with a coil spring, and a threaded fastener secures the ball bearing through the bore into engagement with the output end plate.

6. The torque limiting apparatus of claim 1, wherein the housing comprises a cylindrical body and an output end plate affixed to one end of the cylindrical body.

7. The torque limiting apparatus of claim 1, wherein the output end plate is configured to contain the collar and the adjuster shank within the housing engaged with the spring.

8. The torque limiting apparatus of claim 1, wherein the collar and the adjuster shank each respectively comprise one and another of a pair of complementary male and female threaded cylindrical portions.

* * * * *